Figure 1:
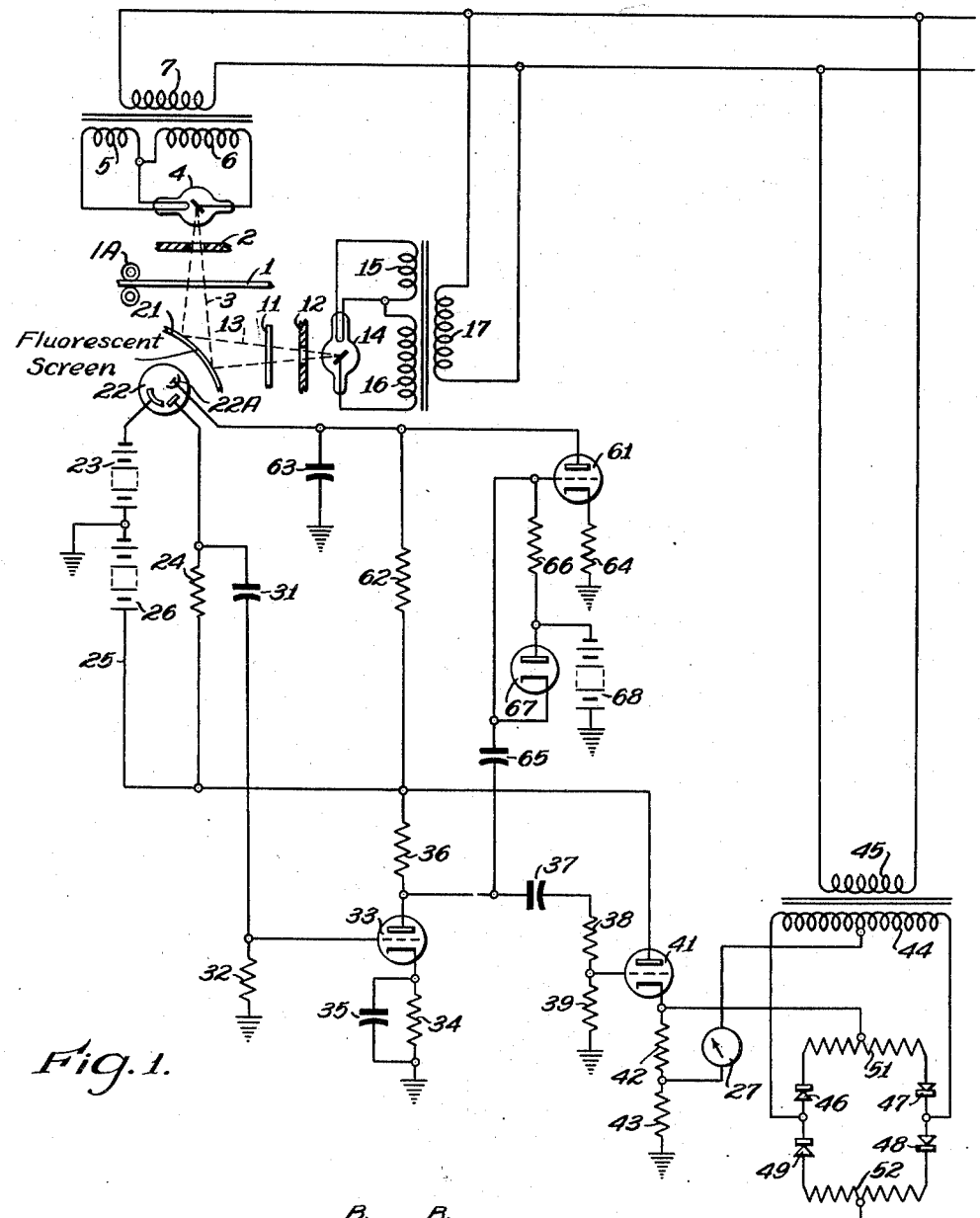

Feb. 20, 1951  R. L. LONGINI  2,542,822
X-RAY THICKNESS GAUGE
Filed Sept. 27, 1947

Time

WITNESSES:
Robert C. Baird
Nw. C. Groome

INVENTOR
Richard L. Longini.
BY F. W. Lyle.
ATTORNEY

Patented Feb. 20, 1951

2,542,822

UNITED STATES PATENT OFFICE 2,542,822

X-RAY THICKNESS GAUGE

Richard L. Longini, Pittsburgh, Pa., assignor to Westinghouse Electric Corporation, East Pittsburgh, Pa., a corporation of Pennsylvania Application September 27, 1947, Serial No. 776,508

9 Claims. (Cl. 250—83.3)

My invention relates to X-ray devices and, in particular, relates to arrangements for employing X-rays to measure the thickness of sheet materials.

In many cases where materials, such as steel, for example, are being rolled or otherwise produced in the form of sheets or strips, it is necessary to gage continuously the thickness of the material being turned out in order to insure uniformity of the product. While mechanical thickness gages have been used, they have many undesirable properties and limitations. They almost invariably have to make contact with the material, and this may mark or mar it; or they may be difficult to use because of its high temperature; or they may strictly limit the speed with which the material may be turned out of the producing apparatus. Since the absorption of X-rays increases with the thickness of a given material, attempts have been made to gage thickness of sheet material being turned out by machines by irradiating them with a beam of X-rays and measuring the amount of X-ray absorption.

There are likewise many instances where, even with materials of uniform thickness, it is desirable to determine whether the composition or other pertinent properties of the material are uniform from point to point therein; and in many instances, the absorption of X-rays passing through the material may be employed for this purpose.

However, difficulty has been found in the development of apparatus thus employing X-rays in providing an incident X-ray beam which is not subject to such variations in intensity and wave length from time to time as would seriously interfere with the accuracy of the absorption measurements. Unless the voltage employed to generate the X-rays and the temperature of the X-ray tube cathode are maintained constant to an extremely high degree of precision, considerable apparent variations in the absorption for a given thickness of metal are found. For example, I have found that a 1% change in the voltage applied between the X-ray tube anode and cathode will result in an error of some 3% in the indicated thickness of the absorbing material on which the X-rays are incident and similar large errors result from changes of the same order of magnitude in the current through the X-ray tube filament. Variations causing even greater errors occur in certain other components of the apparatus previously tried.

I have found that the errors due to variations of the type just mentioned may be eliminated by a system in which the intensity of X-rays transmitted through the sample is compared with the intensity of X-rays emanating from the same source, or a substantially identical source, which are transmitted through a standard body or sheet. In accordance with the embodiment of my invention described in detail herein, the above-mentioned method is carried out by irradiating the sample with an X-ray beam emanating from one X-ray tube during one half cycle of an alternating-current power supply, and irradiating a standard with X-rays emanating from an approximately identical X-ray tube energized from the same power supply during the other half cycle of the alternating voltage. This results in the production, during alternate half cycles of a power supply, of two different X-ray beams, one of which has been transmitted through the sample and the other of which has been transmitted through the standard. The two transmitted beams then act on a suitable intensity measuring device to produce output currents in alternate half cycles of the power supply which are, respectively, measures of the intensity of the two transmitted beams.

By a suitable electronic switching device, the sensitivity of the device measuring the intensity of the transmitted beams is varied, by automatic volume control methods, to produce a substantially constant output current pulse from the measuring device during those half cycles of the power supply in which the measuring device is irradiated by the more intense of the two X-ray beams. As a result, the output current of the same measuring device during those half cycles in which it measures the X-rays transmitted through the thicker of the two materials is proportional to the ratio of the intensity of the X-rays transmitted through the sample and the intensity of the X-rays transmitted through the standard. This ratio is substantially the same for a given sample and a given standard, over a wide range of variations in anode voltage or filament voltage of the X-ray tubes, and is also substantially independent of any gradual variations or drift in the sensitivity and other characteristics of the measuring device itself. A system is thus obtained in which errors due to such variables as have been described in the preceding paragraphs, are eliminated.

One object of my invention is, accordingly, to provide an arrangement for measuring the thickness of sheet and other materials by means of absorption of X-rays or other forms of radiation which is free from errors which have interferred with the accuracy of prior art measuring systems.

Another object of my invention is, accordingly, to provide a thickness measuring arrangement which may produce accurate measurements without physically contacting the material being gaged.

Another object of my invention is to provide a method of measuring the thickness of materials which is capable of accurate operation, even with materials which may be at extremely high temperatures.

Still another object of my invention is to provide an arrangement for measuring the absorption ability in a given material of X-ray and other forms of radiant energy in which the accuracy of the results is not vitiated by substantial variations in the electrical characteristics of the power systems supplying energy to the radiating source.

Still another object of my invention is to provide an arrangement for measuring the absorption ability for X-rays or other radiation in test materials which is substantially unaffected by variations in the characteristics of the radiation-measuring device employed as a component thereof.

A still further object of my invention is to provide a thickness or radiation transmission gage leaving over a wide range a substantially linear relationship between output current and the measured quantity.

Still another object is to provide a gage which permits the use of a large signal at all times regardless of whether the sample or the standard of reference is the greater in thickness.

Figure 2:
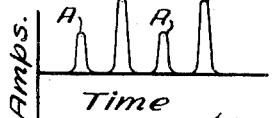

Other objects of my invention will become apparent upon reading the following description, taken in connection with the drawing, in which:

Figure 1 is a schematic diagram of one electrical circuit capable of embodying the principles of my invention; and Fig. 2 is a graph showing the variation with time of certain currents in the output circuit of an electrical radiation-meter forming a component of my system.

Referring in detail to Fig. 1, a material of which the thickness is to be measured, which may, for example, be a band 1 of sheet steel passing through a rolling mill 1A, is arranged to pass continuously in front of a shield 2 having an aperture through which an X-ray beam 3 is being projected from an X-ray tube 4 of suitable type. The X-ray tube 4 has its cathode excited from a transformer winding 5 and has voltage impressed on its anode from a second transformer winding 6 which may be energized by a primary winding 7 supplied from a suitable alternating-current power source (not shown). A standard specimen 11, which may, for example, be a piece of sheet steel having the thickness which it is desired to have the sheet 1 duplicate, is arranged to be irradiated with X-rays through an aperture in a second shield 12 by an X-ray beam 13 from an X-ray tube 14 which is preferably, although not necessarily, a matched tube to the X-ray tube 4. The tube 14 has its cathode supplied from a secondary winding 15 and its anode supplied from a secondary winding 16. The windings 15 and 16 are matched with the windings 5 and 6 respectively, and energized from a primary winding 17, which is preferably one matched with the transformer winding 7 and supplied from a suitable alternating-current source (not shown).

The X-ray beams 3 and 13 are arranged to be coincident on a fluorescent screen 21, and a photo-sensitive tube 22 is arranged to be energized by the light emitted from the screen 21. We have found a very practical arrangement in having the photo-sensitive tube 22 consist of a photo-multiplier tube of which many suitable types are well known today in the tube art. Such a tube produces an amplification of the metal photo-current from the cathode by the successive ejection of secondary electrons from a series of electrodes called dynodes. As is well known, such tubes produce an output current of very substantial intensity, even when irradiated by relatively low intensity light. The amplification of such a device may be varied by changing the voltage on one or more of the dynodes such as that indicated at 22A in Fig. 1. The tube 22, as shown in the drawing, is purely symbolical, rather than a structural representation of such a photo-multiplier tube.

The photo-sensitive cathode of the tube 22 is preferably connected to the negative terminal of a voltage source 23 having its positive terminal grounded. The output anode of the tube 22 is connected through a suitable resistor 24 to the positive terminal 25 of a second voltage source 26 which has its negative terminal grounded. This arrangement is such that the resistor 24 is traversed by a current which is, from instant to instant, a replica of the intensity variations of the radiation incident upon the screen 21.

Since the voltage applied to the anodes of the X-ray tubes 4 and 14 is alternating, they irradiate the specimens 1 and 11, respectively, only during one-half cycle of the alternating-voltage supply (not shown). The transformer windings 6 and 16 are so poled that the anode of the X-ray tube 4 is positive during one-half cycle and the anode of X-ray tube 14 is positive during the second half of each cycle. It will be seen to result from this that the beams 3 and 13, respectively, energize the photo-multiplier tube 22 during alternate half cycles of the source (not shown). The output current from tube 22, flowing through resistor 24, therefore, consists of a series of pulses, alternate members of the series, respectively, being proportional in amplitude to the intensity of the radiations transmitted through the sample 1 and the standard 11. These pulses are further amplified by a tube 33 resulting in an output measurable across a resistor 36.

Fig. 2 illustrates the variation of the current through the resistor 36 with time, the pulses A being measures of the intensity of the transmitted radiation in beam 3 passing through the sample 1, and the pulses B being measures of the intensity of the radiation of the transmitted beam passing through the standard 11 on alternate half cycles of the power source (not shown).

The remainder of the circuit network now about to be described has the following two purposes: first, to impress gain control voltages on the photo-sensitive tube 22 and the subsequent amplifier 33 of such character that the larger of the two pulses of current A' and B' through resistor 36 are substantially always of the same amplitude regardless of any variations in absolute value of the transmitted radiation in beam 13 and also regardless of any variations from time to time in the characteristics of elements such as amplifier 33 or photo-sensitive tube 22; and, second, to produce on a meter 27 a deflection which is substantially proportional to the ratio of the amplitudes of pulses A and B.

Since one or the other of these amplitudes is always equal to a constant quantity which amplitude is dependent only upon the setting of the regulator, the magnitude of the smaller pulse is proportional to the ratio of transmission of the thicker of the sample and standard to the thinner of these two. The difference between these two pulses is an exponential function of the difference in thickness of the sample and standard and is independent in magnitude of the direction of this difference. For small differences of thickness the difference in pulse magnitude is proportional to the thickness difference. The phase of the pulse difference indicates which pulse corresponds to the standard and which corresponds to the sample. Meter 27 is so arranged that the phase of the difference determines its direction of deflection.

Turning in detail to the circuit for effecting the above-mentioned results, a coupling capacitor 31 and a resistor 32 are connected between the anode of the photo-sensitive tube 22 and ground, the common terminal of capacitor 31 and resistor 32 being coupled to a control electrode of an amplifier tube 33 having its cathode grounded through a cathode resistor 34 shunted by a capacitor 35. The anode of the tube 33 is connected through a resistor 36 to the positive terminal 25 of voltage source 26. The foregoing connections are such as to produce in resistor 36 current pulses A and B which substantially duplicate, with reversed polarity, the output current pulses of the multiplier tube 22.

The anode of tube 33 is connected to ground through a coupling capacitor 37 and a pair of resistors 38 and 39. The common terminal of the resistors 38 and 39 is connected to the control electrode of an amplifier tube, 41, preferably of the cathode-follower type, which has its cathode connected to ground through a pair of equal resistors 42 and 43. The anode of the tube 41 is connected to the positive terminal 25 of voltage source 26.

The common terminal of resistors 42 and 43 is connected through direct-current meter 27 to the mid point of a transformer secondary winding 44 which is energized from the alternating-current supply 8 through a primary winding 45. The opposite terminals of the secondary winding 44 are, respectively, connected to two diametrically opposite points on a ring circuit comprising four rectifiers 46, 47, 48 and 49 which may conveniently be of the dry contact type. The rectifiers 46, 47, 48 and 49 are poled in the same direction around the ring-circuit embodying them, the ends of the winding 44 being, respectively, connected to the common terminal of the rectifiers 46, 49 and the common terminal of the rectifiers 47, 48 as indicated. The free terminals of the rectifiers 46 and 47 are connected to each other through a resistor 51, and the free terminals of the rectifiers 48, 49 are connected to each other through an identical resistor 52. The mid point of the resistor 52 is grounded, and the mid point of the resistor 51 is connected to the cathode of the cathode-follower tube 41.

The rectifiers 46, 47, 48 and 49 and the associated network may be referred to as a lock-in modulator, and this circuit may be shown to have the following property. If an alternating voltage is impressed between the resistors 51, 52, which is of the same frequency as the alternating voltage impressed by secondary winding 44, the needle of the direct-current meter 27 will be deflected to one side if the said alternating current voltages are cophasal and will be deflected to the other side if they are 180 degrees out of phase with each other. The applicability of these properties of the network to the present arrangement will be evident from the following.

When the thickness of the sample 1 and the standard material 11 are identical, the pulses A and B in Fig. 2 will have identical amplitudes. If the sample 1 is thicker than standard 11, the pulses A will be of lower amplitude than pulses B, and Fig. 2 may be considered to illustrate the current through the resistor 36 under this condition. On the other hand, if the sample 1 is thinner than the standard 11, the pulses A will be of greater amplitude than the pulses B. Under such circumstances, the current represented by Fig. 2 may be analyzed into three components, a direct current, a current of twice the frequency of the alternating current power source (not shown), plus higher harmonics, and a current having the frequency of the alterating current power source (not shown). The direct-current component will naturally not be transmitted through coupling capacitor 1 to the remainder of the system and will, accordingly, have no effect on meter 27. The higher frequency current component will be transmitted through the amplifiers 33 and 41 and will be impressed on the terminals 51, 52; but being of a different frequency than the voltage impressed by secondary winding 44, will produce no perceptible deflection on meter 27. However, the component of the current indicated by Fig. 2, which has the same frequency as that of power supply (not shown), will be transmitted and amplified by the amplifier tube 41 and will be impressed across the terminals 51 and 52 of the lock-in modulator network above described.

A moment's consideration of Fig. 2 will show that the current having the same frequency as the alternating current power source (not shown) will have a minima corresponding to the pulses A and maxima corresponding to the pulses B under the conditions represented by Fig. 2; namely, where the sample 1 is thicker than standard 11. On the other hand, where the sample 1 is thinner than standard 11 and the pulses A are of greater amplitude than pulses B, the component of the Fig. 2 current having the frequency of the alternating current power source (not shown) would have its maxima coincident with pulses A and its minima coincident with pulses B. In other words, the phase of this current component will change through 180 degrees whenever the sample 1 changes from a thickness less than that of standard 11 to a thickness greater than that of standard 11. Thus, if the voltage which output resistor 36 impresses through amplifier 41 on terminals 51 and 52 is cophasal with the voltage impressed by transformer winding 44 when the sample 1 is thicker than standard 11, those respective voltages will be of opposite phase if the thickness of sample 1 is less than that of standard 11. But it has just been shown that instrument 25 has deflected in one direction when the aforesaid pairs of voltages impressed on the lock-in modulator network are cophasal, and is deflected to the other side when those voltages are opposite in phase. Hence, it follows that the instrument 27 will show a deflection to one side when the sample 1 is thinner than standard 11; and to the opposite side when the sample 1 is thicker than the standard 11. It can also be shown that the magnitude of the deflection of the instrument 27 is, over a wide range, substantially proportional to the difference in amplitude of pulses A and B in Fig. 2, and is thus substantially proportional to the algebraic difference in thickness of sample 1 from standard 11 under the conditions previously outlined.

A brief consideration will show that the network comprising elements 42 through 52 may be considered merely to be one particular arrangement which selectively compares the relative phase of two alternating voltages of like frequency; and there are many circuits known to be capable of performing that function which may be substituted for that network in my arrangement. For example, an electron tube operating on a non-linear part of its characteristic can be shown to produce a direct current output which varies in magnitude with the relative phases of two voltages of like frequency impressed on its control electrode, voltages of unlike frequency on the other hand producing only alternating currents in the output circuit. A direct-current instrument in the output of many suitable circuits embodying such electron tubes will thus change in reading when the relative phase of two impressed voltages of like frequency reverses. Such circuits may be substituted for network 42 through 52 herein.

An amplifier tube 61 and its appurtenant circuits has the property of insuring that, regardless of the absolute value of the transmitted radiation 13, and of changes in sensitivity of the photo-sensitive tube 22, the height of the larger of the pulses A and B which pass through the output resistor 36, remains substantially constant. The tube 61 has its anode connected through a resistor 62 to the positive terminal 25 of voltage source 26. The anode of tube 61 is likewise connected to a volume control electrode in photo-sensitive tube 22, and to ground through a capacitor 63. The cathode of the tube 61 is connected to ground through a cathode resistor 64 and its control electrode is connected through a capacitor 65 to the anode of amplifier tube 33. The control electrode of tube 61 is likewise connected through a resistor 66 in multiple with a rectifier 67 which may be of the diode vacuum tube type to the negative terminal of a voltage source 68 having its positive terminal grounded.

The result of the above-described connections is that tube 61 is connected in shunt across capacitor 63 which derives its voltage from source 26 through resistor 62, and that capacitor 63 provides the operating voltage for the gain control electrode 22A in photo-multiplier tube 22. This operating voltage is adjusted by the magnitude of the pulses A and B.

The larger of pulses A and B in the output resistor 36 of amplifier tube 33 are impressed as a series of short positive pulses on the input electrode of tube 61, causing it to periodically discharge capacitor 63. Between these periodic discharges charge flows into capacitor 63 through resistor 62 from source 26. As a result, the voltage of capacitor 63 has a sawtooth ripple of small magnitude. Capacitor 63 operates thus until a decrease in thickness of sample 1 causes a pulse A' or B' which is larger than its immediate predecessors to appear on resistor 36. Such a pulse, let us say A, will impress a more positive voltage on resistor 66 and on the control electrode of tube 61, causing the latter to become more conductive, and capacitor 63 will discharge further. The potential impressed on the automatic volume control electrode of tube 22 thus becomes less positive and the current flow through resistor 24 decreases. Accordingly, the gain of the photo-multiplier tube 22 is reduced, and the current increase through resistor 36 which produced the original change is counteracted. Since tubes 33 and 61, together with their attendant circuits, are designed to be extremely sensitive to small changes in voltage of their control electrodes, the net result is that the current flowing through resistor 36 during pulses A is reduced again nearly to the value it had before the above-mentioned corrective changes were set in action by current increase through resistor 36 during the A pulse phase.

It will be noted that the capacitor 63, connected between the gain control electrode 22A and ground, acquires its charge from the voltage source 26 through resistor 62, but is prevented from attaining the full source voltage by being periodically partially discharged by the current pulses through the control tube in accordance with the magnitude of pulses A and B as described above. The resistor 62 is so proportioned relative to capacitor 63 that, while this charge on capacitor 63 gradually rises through resistor 62 during a half cycle of the supply source (not shown), the amount of this increase in the voltage of capacitor 63 is small. Thus the gain of the photo-multiplier tube 22 is set by the control tube 61 to hold the pulses A or B at a constant level. If the pulse immediately following such an adjustment of the voltage of capacitor 63 is not materially greater than its predecessor it will not cause tube 61 to discharge that capacitor, and the gain of photo-multiplier tube is left substantially at this same value by that pulse. Thus the gain of the measuring tube 22 is controlled to maintain the greater of the two pulses A and B substantially constant.

Though the signal current flowing through the resistor 36 consists of a series of pulses which fall substantially to zero near the end of every half cycle of voltage of the supply source (not shown), the use of capacitor coupling between the photo-multiplier anode 22 and the amplifier tube 33 and likewise between the amplifier tube 33 and the control tube 61 results in the loss of a base reference level. Since a capacitor cannot pass direct current, the voltage output of the capacitor 65 would, in the absence of the rectifier tube 67, consist of an alternation both positive and negative about a base line or zero level which would be determined by the areas and shapes of both pulses A and B. The rectifier 67, however, permits the passage to ground of current whenever its cathode is negative with respect to its anode, thus charging the condenser 65 to a direct-current potential such that the cathode of the rectifier 67 goes negative at the interval between pulses only by the very slight amount necessary to make up for the loss of charge through the resistor 66 during the positive swing of the pulse. Thus the voltage across the resistor 66 falls substantially to zero between pulses, and the voltages on the control grids of the tubes 61 during the pulses are essentially measured individually from the true zero level.

Though the use of this base line restoring system is desirable, it may be omitted without introducing much change in scale reading, since the effect of sample pulses A on the apparent height of the standard pulses B always bears a functional relationship to the height of pulses A, and the net effect will be merely to change the scale calibration of the indicating meter.

I claim as my invention:

1. In an apparatus for measuring radiation absorption of material, means to hold said material and a standard unit of material, a source of radiation, means to irradiate said standard unit and said material alternately from said source, measuring means to produce an output which is substantially proportional on each of said respective alternations to the intensity of radiation transmitted alternately through said standard unit and said material, sensitivity control means for said measuring means to make its response to the radiation transmitted by the one of said materials which is transmitting the greater radiation intensity equal to an invariable value, and means for producing an output which is responsive in one sense when said invariable response is due to the radiation transmitted by one of said materials, and is responsive in the opposite sense when said invariable response is due to the radiation transmitted by said other material, said output being proportional to the difference in the radiation intensities transmitted by said materials.

2. In means for measuring the radiation absorption of a material, an alternating power supply, a source of radiation, means for holding said material and a standard unit of material, means powered by said supply to irradiate said standard unit and said material alternately during successive half cycles of said supply, measuring means to produce an output which is substantially proportional to the intensity of radiation transmitted alternately through said unit and through said material, sensitivity control means for said measuring means to make its response to the radiation transmitted by one of said materials equal to an invariable value, a ring comprising successively a first pair of similarly poled rectifiers, a first resistor, a second pair of similarly poled rectifiers and a second resistor in series relation, said polarities being relative to current flow around said ring, a first pair of terminals connected to the mid points of said resistors, a second pair of terminals connected, respectively, to the common junction of said first pair of rectifiers and to the common junction of said second pair of rectifiers, and means to impress the output of said measuring means and a voltage derived from said power supply across said first pair of terminals and across said second pair of terminals respectively.

3. In means for measuring the radiation absorption of a material, means to hold said material and a standard unit of material, a source of radiation, means to irradiate said standard unit and said material alternately from said source, means having a sensitivity control electrode to produce an output which is substantially proportional to the intensity of radiation transmitted alternately through said standard unit and through said material, a capacitor connected to impress voltage on said sensitivity control electrode, a direct-current source to charge said capacitor through an impedance, an electrical discharge tube in shunt circuit to said capacitor, and means whereby the output of said measuring means is in uninterrupted control of the conductivity of said discharge tube and is tending to render it more conductive when the response of said measuring means to radiation increases.

4. In means for measuring the radiation absorption of material, means for holding said material and a standard unit of material, a source of radiation, an alternating-current source to furnish power to said source of radiation, measuring means to produce an output which is substantially proportional to the intensity of radiation transmitted alternately through said standard unit and said material, sensitivity control means for said measuring means, means to impress the output of said measuring means on said sensitivity control means to make its response on one-half cycle of said alternating-current source equal to an invariable value, a ring comprising successively in series relation a first pair of similarly poled rectifiers, a first resistor, a second pair of similarly poled rectifiers and a second resistor, said polarities being relative to current flow around said ring, a first pair of terminals connected to the mid points of said resistors, a second pair of terminals connected, respectively, to the common junction of said first pair of rectifiers and to the common junction of said second pair of rectifiers, and means to impress the output of said measuring means and a voltage derived from said power supply across said first pair of terminals and across said second pair of terminals respectively.

5. In means for measuring the radiation absorption ability of a material, means for holding said material and a standard unit of material, a source of radiation, means to irradiate said standard unit and said material to be measured alternately from said source, measuring means having a sensitivity control electrode to produce an output which is substantially proportional on each of said alternations to the radiation transmitted through said standard unit and said material to be measured, a capacitor connected to impress voltage on said sensitivity control electrode, a direct-current source to charge said capacitor through an impedance, an electrical discharge tube in shunt circuit to said capacitor, means whereby the output of said measuring means is in uninterrupted control of the conductivity of said discharge tube and is tending to render it more conductive when the response of said measuring means to the radiation increases, and means responsive in one sense when the output of said measuring means is greater for the radiation transmitted through said standard unit than for the radiation transmitted through said material, and is responsive in the opposite sense when said output is less for the radiation transmitted through said standard unit than it is for the radiation transmitted through material.

6. In means for measuring the radiation absorption ability of a material, an alternating power supply, a source of radiation, means for holding said material and a standard unit of material, means powered by said supply to irradiate said standard unit and said material alternately during successive half cycles of said supply, measuring means to produce an output which is substantially proportional to the intensity of radiation transmitted alternately through said standard unit and through said material, sensitivity control means having a control electrode for said measuring means to make its response to the radiation transmitted by one of said materials equal to an invariable value, a capacitor connected to impress voltage on said control electrode, a direct-current source to charge said capacitor through an impedance, an electrical discharge tube in shunt circuit to said capacitor, means whereby the output of said measuring means is in uninterrupted control of the conductivity of said discharge tube and is tending to render it more conductive when the response of said measuring means to the radiation increases, a ring comprising a first pair of similarly poled rectifiers, a first resistor, a second pair of similarly poled rectifiers and a second resistor in series, a first pair of terminals connected to the mid points of said resistors, a second pair of terminals connected, respectively, to the common junction of said first pair of rectifiers and to the common junction of said second pair of rectifiers, and means to impress the output of said measuring means and a voltage derived from said power supply across said first pair of terminals and across said second pair of terminals respectively.

7. In means for measuring the radiation absorption ability of a material, means to hold said material and a standard unit of material, a source of radiation, means to irradiate said standard unit and said material alternately from said source, an alternating-current source supplying power to said source of radiation, means having a sensitivity control electrode to produce an output which is substantially proportional to the intensity of radiation transmitted alternately through said standard unit and through said material, a capacitor connected to impress voltage on said sensitivity control electrode, a direct-current source to charge said capacitor through an impedance, an electrical discharge tube in shunt circuit to said capacitor, means whereby the output of said measuring means is in uninterrupted control of the conductivity of said discharge tube and is tending to render it more conductive when the response of said measuring means to the radiation increases, a ring comprising a first pair of similarly poled rectifiers, a first resistor, a second pair of similarly poled rectifiers and a second resistor in serial relation, a first pair of terminals connected to the mid points of said resistors, a second pair of terminals connected, respectively, to the common junction of said first pair of rectifiers and to the common junction of said second pair of rectifiers, and means to impress the output of said measuring means and a voltage derived from said power supply across said first pair of terminals and across said second pair of terminals respectively.

8. The method of measuring radiation absorption ability of a material which comprises the steps of alternately irradiating said material and a standard unit of material with two approximately constant fluxes of radiation, measuring the respective strength of the radiation transmitted during such alternate irradiations, varying the sensitivity of the measurement so that the response in measuring to the more intense of said transmitted radiations is kept substantially invariable, utilizing in a work crcuit said measurement on the less intense of said alternate irradiations and indicating which of said transmitted radiations is the more intense.

9. The method of measuring the radiation absorption ability of a material which comprises the steps of alternately irradiating said material and a standard unit of material with two approximately constant fluxes of radiation, measuring the respective strength of the radiation transmitted during such alternate irradiations, varying the sensitivity of the measurement so that the response in measuring to the more intense of said transmitted radiations is kept substantially invariable, indicating in a work circuit the reading of said measurement on the less intense of said alternate irradiations and indicating which of said transmitted radiations is the more intense.

RICHARD L. LONGINI.

REFERENCES CITED

The following references are of record in the file of this patent:

UNITED STATES PATENTS

| Number | Name | Date |
|---|---|---|
| 1,806,197 | Hardy et al. | May 19, 1931 |
| 2,198,233 | Snyder | Apr. 23, 1940 |
| 2,264,725 | Shoupp et al. | Dec. 2, 1941 |
| 2,401,288 | Morgan et al. | May 28, 1946 |
| 2,467,844 | Michel | Apr. 19, 1949 |
| 2,469,206 | Rich | May 3, 1949 |

OTHER REFERENCES

Smith: General Electric Review, March 1945, pp. 13–17.